(12) United States Patent
Gruber et al.

(10) Patent No.: US 9,447,260 B2
(45) Date of Patent: Sep. 20, 2016

(54) METHODS FOR PREPARING NANOPARTICLE-CONTAINING THERMOPLASTIC COMPOSITE LAMINATES

(75) Inventors: Mark B. Gruber, Landenberg, PA (US); Brian J. Jensen, Williamsburg, VA (US); Roberto J. Cano, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 521 days.

(21) Appl. No.: 12/641,603

(22) Filed: Dec. 18, 2009

(65) Prior Publication Data
US 2010/0218890 A1  Sep. 2, 2010

Related U.S. Application Data

(62) Division of application No. 12/144,105, filed on Jun. 23, 2008, now abandoned.

(60) Provisional application No. 60/946,748, filed on Jun. 28, 2007.

(51) Int. Cl.
| | |
|---|---|
| *B29C 51/00* | (2006.01) |
| *C08K 7/24* | (2006.01) |
| *B82Y 30/00* | (2011.01) |

(Continued)

(52) U.S. Cl.
CPC ............ *C08K 7/24* (2013.01); *B32B 27/08* (2013.01); *B32B 27/20* (2013.01); *B82Y 30/00* (2013.01); *C08J 5/005* (2013.01); *C08K 3/346* (2013.01); *C08K 7/06* (2013.01); *C08L 71/00* (2013.01); *B32B 2250/05* (2013.01); *B32B 2262/06* (2013.01); *B32B 2262/08* (2013.01); *B32B 2262/101* (2013.01); *B32B 2262/106* (2013.01); *B32B 2262/14* (2013.01); *B32B 2605/00* (2013.01); *C08G 2650/40* (2013.01); *C08J 2371/00* (2013.01); *C08J 2379/08* (2013.01); *C08K 2201/011* (2013.01);

(Continued)

(58) Field of Classification Search
CPC .................................................. B29C 51/145
USPC ............... 264/258, 248, 251, 257; 156/308.2
See application file for complete search history.

(56) References Cited

U.S. PATENT DOCUMENTS

| | | | | |
|---|---|---|---|---|
| 2,797,179 A | * | 6/1957 | Kress et al. ................. | 264/257 |
| 3,370,997 A | * | 2/1968 | Hoppeler ..................... | 156/62.8 |

(Continued)

OTHER PUBLICATIONS

Dry Ribbon for Heated Head Automated Fiber Placement A. Bruce Hulcher et al No Date Known.*

(Continued)

*Primary Examiner* — Jacob Thomas Minskey
(74) *Attorney, Agent, or Firm* — Helen M. Galus; Jennifer L. Riley

(57) ABSTRACT

High quality thermoplastic composites and composite laminates containing nanoparticles and/or nanofibers, and methods of producing such composites and laminates are disclosed. The composites comprise a thermoplastic polymer and a plurality of nanoparticles, and may include a fibrous structural reinforcement. The composite laminates are formed from a plurality of nanoparticle-containing composite layers and may be fused to one another via an automated process.

14 Claims, 1 Drawing Sheet

(51) Int. Cl.
*C08J 5/00* (2006.01)
*C08K 3/34* (2006.01)
*C08K 7/06* (2006.01)
*C08L 71/00* (2006.01)
*B32B 27/08* (2006.01)
*B32B 27/20* (2006.01)
*C08L 65/00* (2006.01)
*C08L 79/08* (2006.01)

(52) U.S. Cl.
CPC ............... *C08L 65/00* (2013.01); *C08L 79/08* (2013.01); *Y10T 156/10* (2015.01); *Y10T 428/25* (2015.01)

(56) References Cited

U.S. PATENT DOCUMENTS

| | | | |
|---|---|---|---|
| 4,151,031 A * | 4/1979 | Goad et al. | .................... 156/201 |
| 4,714,509 A * | 12/1987 | Gruber | ........................ 156/272.2 |
| 6,872,403 B2 | 3/2005 | Pienkowski et al. | |
| 6,919,394 B2 | 7/2005 | Miyoshi et al. | |
| 6,934,600 B2 | 8/2005 | Jang et al. | |
| 7,001,556 B1 * | 2/2006 | Shambaugh | ................ 264/210.6 |
| 7,019,062 B2 | 3/2006 | Van Beek et al. | |
| 7,151,129 B2 | 12/2006 | Ishikawa et al. | |
| 7,153,452 B2 | 12/2006 | Ogale et al. | |
| 7,790,841 B1 * | 9/2010 | Yandek et al. | ................. 528/480 |
| 2002/0059976 A1 * | 5/2002 | Taggart | ........................ 156/177 |
| 2004/0067364 A1 * | 4/2004 | Ishikawa et al. | ........... 428/411.1 |
| 2004/0089851 A1 | 5/2004 | Wang et al. | |
| 2006/0118244 A1 | 6/2006 | Zaballos et al. | |
| 2007/0100058 A1 | 5/2007 | Noguchi et al. | |
| 2007/0104934 A1 | 5/2007 | Cairo | |

OTHER PUBLICATIONS

Materials for Heated Head Automated Thermoplastic Tape Placement Brian J. Jensen et al No Date Known.*

Mark A. Lamontia, Mark B. Gruber and Brian J. Jensen, "Optimal Composite Material for Low Cost Fabrication of Large Composite Aerospace Structures Using NASA Resin or Poss Nanoparticle Modification," 27th International SAMPE EUROPE Conference 2006, Paris EXPO, (p. 1-6), (Mar. 27, 2006).

Jensen, Brian J. et al, "Materials for Heated Head Automated Thermoplastic Tape Placement", May 21, 2012, conference paper for SAMPE 2012 May 21-24, 2012 Baltimore, MD USA.

Hulcher, A. Bruce et al, "Dry Ribbon for Heated Head Automated Fiber Placement", Jan. 1, 2000, Technical Report for NASA Langley Research Center, Hampton, VA, USA.

ATP CM Tape_lay_1course.mpg, Generic Automated Tape Placement Demonstration, filmed 1998.

* cited by examiner

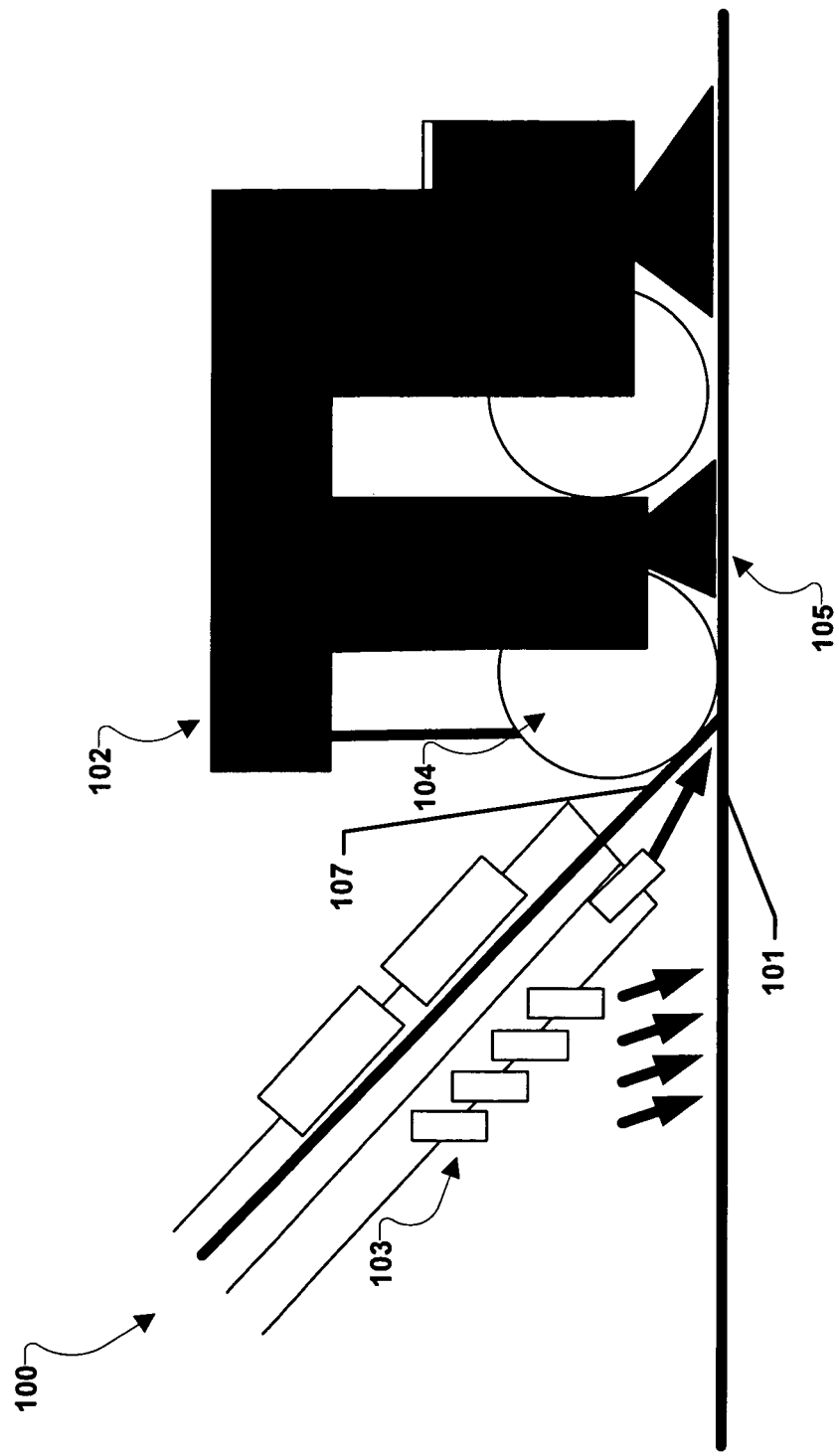

METHODS FOR PREPARING NANOPARTICLE-CONTAINING THERMOPLASTIC COMPOSITE LAMINATES

CROSS-REFERENCE TO A RELATED APPLICATION

This application is a divisional of commonly-owned patent application Ser. No. 12/144,105, filed Jun. 23, 2008, which, pursuant to 35 U.S.C. §119, claimed the benefit of priority from provisional patent application having U.S. Ser. No. 60/946,748, filed on Jun. 28, 2007, the contents of which are incorporated herein in their entirety.

ORIGIN OF THE INVENTION

The invention described herein was made by employees of the United States Government and may be manufactured and used by or for the Government for Government purposes without payment of any royalties thereon or therefore.

FIELD OF THE INVENTION

The present disclosure relates to high quality thermoplastic composites containing nanoparticles and/or nanofibers, and to methods of producing such composites. The present disclosure also relates to methods of producing high quality nanoparticle-containing composite laminates.

BACKGROUND OF THE INVENTION

Thermoplastic composites are high strength material systems which are finding wide spread application in a variety of fields including aero structures, non-aero military structures, such as tanks and armored vehicles, and non-military structures such as automotive components, sporting goods, and industrial and medical devices. Typically, the composites comprise fiber reinforcements embedded in a resin matrix. Fiber reinforcements which have been contacted, e.g., coated and/or impregnated, with a resin are layered and joined to one another to form a composite laminate. Recently, automated lay-up of fiber-reinforced resin composites has replaced hand lay-up as a more economical and efficient method of producing composite laminates. Automated composite lay-up, such as heated head tape placement, filament winding, etc. requires the fiber-reinforced composites to have certain processing characteristics to produce high quality laminates. Additionally, there is an ongoing desire to improve the functional and mechanical properties of the laminates and to tailor these properties to specific applications.

SUMMARY OF THE INVENTION

In accordance with an embodiment, a nanoparticle-containing composite comprises a thermoplastic polymer matrix resin and a plurality of nanoparticles. In some embodiments, the composite may also include a fibrous structural reinforcement.

In accordance with another embodiment, a nanoparticle-containing composite laminate comprises a plurality of fused layers of nanoparticle-containing composites.

In accordance with yet another embodiment, a method of producing a nanoparticle-containing composite laminate comprises combining a thermoplastic polymer matrix resin with a plurality of nanoparticles to form a plurality of nanoparticle-containing composites, layering the plurality of nanoparticle-containing composites, and applying heat and/or pressure to the layered composites to fuse the composites. In some embodiments, the method may also include contacting a fibrous structural reinforcement with the thermoplastic polymer matrix resin and plurality of nanoparticles to form the plurality of nanoparticle-containing composites. Advantageously, in some embodiments the application of heat and/or pressure may be via an automated process.

Nanoparticle-containing thermoplastic composites and composite laminates, and methods of producing nanoparticle-containing thermoplastic composites and composite laminates provide numerous advantages in the art. For example, thermoplastic composites that are suitable for automated placement, e.g., non-autoclave fabrication, provide an economical method to prepare high quality composite laminates cost effectively. Additionally, the size constraints imposed by autoclave fabrication may be eliminated allowing the nanoparticle-containing thermoplastic composite laminates to be utilized in a multitude of new applications.

Nanoparticle-containing thermoplastic composites and composite laminates may possess a variety of improved mechanical and functional properties. For example, thermoplastic composites having improved strength, modulus, impact resistance, toughness, conductivity, permeation resistance, and radiation absorption may be prepared according to the present embodiments. The disclosed nanoparticle-containing thermoplastic composites may have improved thermal and flame resistance, improved moisture and chemical resistance, increased hydrophobicity or oleophobicity, increased hydrophilicity or oleophilicity, and improved charge dissipation, and thermal/electrical conductivity. Additionally, the nanoparticle-containing thermoplastic composites may have unique and advantageous crystalline and/or amorphous properties. As an additional advantage, the presently disclosed nanoparticle-containing composite laminates may be particularly well-suited for automated processing. Automated processing, such as heated head placement and filament winding offer a low cost alternative to autoclave and press fabrication, and produce composites having properties that cannot be achieved using other processing methods. For example, automated tape laying processing provides extremely fast heat-up and cool down rates, and may allow unique crystalline and/or amorphous composite laminates to be formed.

BRIEF DESCRIPTION OF THE DRAWINGS

FIG. 1 is a schematic cross section view of a moving heated head system suitable for use in the various embodiments.

DESCRIPTION OF THE PREFERRED EMBODIMENTS

Nanoparticle-containing composites, according to an embodiment, may comprise a thermoplastic polymer matrix resin and a plurality of nanoparticles. In some embodiments, the composites may further include a fibrous structural reinforcement.

The thermoplastic polymer matrix resin may comprise any of a multitude of thermoplastic polymers including those commonly used in the composites art. For example, thermoplastic polymers may include, but are not limited to: thermoplastic polyketones, including polyetherketones, such as PEEK and PEKK; polyethylene; polypropylene;

polyimides, such as the ULTEM family of products available from G.E. Plastics, and the family of products available from IMITEC based on a license from NASA Langley Research Center; polyarylene ethers; polysulfones; polyamides, such as nylon; polyesters; polystyrene; acrylonitrile butadiene styrene (ABS); acrylic; celluloid; cellulose acetate; ethylene vinyl acetate (EVA); ethylene vinyl alcohol (EVAL); fluoroplastics, such as PTFE, FEP, PEA, CTFE, ECTFE, and ETFE; ionomers; liquid crystal polymers (LCP); polyacetal (POM or acrylonitrile); polyamide-imide (PAI); polyaryletherketone (PAEK); polybutadiene (PBD); polybutylenes; polybutylene terephthalate (PBT); polyethylene terephthalate (PET); polycyclohexylene dimethylene terephthalate (PCT); polycarbonate, polvhydroxyalkanoates (PHAs); polyester polyetherimide (PEI); polysulfones, including polyethersulfone; polyethylenechlorinates; polylactic acid; polymethylpentene; polyphenylene oxide; polyphenylene sulfide; polyphthalamide; polyvinyl chloride; polyvinylidene chloride; and mixtures thereof may be utilized in embodiments. Additional thermoplastic polymers which may be used include those which are suitable for carrying mechanical loads, resisting degradation at elevated temperatures, and/or resisting dissolution in solvents. The particular selection of a thermoplastic polymer depends on the desired end use for the composite, and is well within the ordinary skill of those in the art.

Thermoplastics are designed to melt, flow, and consolidate and are typically non-reactive. Thus, thermoplastics generally do not undergo a chemical reaction during processing and do not require additives such as curing agents, accelerators and hardeners. However, in some embodiments, one or more additives may be utilized to tailor the properties of the thermoplastic to the processing parameters. For example, in some embodiments, a flow modifier may be added to the thermoplastic polymer to adjust the melt viscosity of the polymer. The particular selection of a flow modifier may depend on the thermoplastic polymer being used and the method of processing, and is well within the ordinary skill of those in the art.

According to the present disclosure, the composite also includes a plurality of nanoparticles. The nanoparticles may be formed from any of a variety of materials. In many embodiments, the nanoparticles resist being melted, compressed or flattened when exposed to the pressures and temperatures encountered during processing, e.g., the nanoparticles remain rigid. Some exemplary materials from which the nanoparticles may be formed include, but are not limited to, inorganic materials, such as ceramics, silicons, and clays, and organic materials, such as carbon, including carbon nanotubes and carbon nanofibers. The particular selection of material may depend on the desired end use for the composite and the property enhancement desired. For example, in some embodiments, nanoparticles comprising carbon nanotubes may improve mechanical properties of a composite, such as strength, modulus, and toughness, and functional properties including conductivity and static discharge. A variety of nanoparticles are commercially available and the particular selection of nanoparticles for a particular application is well within the ordinary skill of those in the art.

The nanoparticles, according to embodiments, may have a multitude of configurations, including but not limited to: bead-like spheres, oblate spheroids, tubes, fibers, and/or one or more irregular shapes. The nanoparticles may have any size that does not adversely affect the melt flow of the thermoplastic polymer matrix resin. For example, the nanoparticles may have a particle size of less than about 999 nm, or less than about 700 nm, or less than about 500 nm, or as a further example, a particle size of less than about 200 nm.

The composites may include varying amounts of nanoparticles. For example, in some embodiments the nanoparticles may comprise from about 0.1 to about 40 wt % of the total composite, or from about 0.1 to about 25 wt %, or from about 0.1 to about 10 wt %, or as yet another example, from about 0.5 to about 5 wt % of the total composite. The particular amount may depend on a variety of factors, including for example, the property enhancement desired for the composite. For example, in some embodiments, one or more functional properties of a fiber reinforced composite may be improved by including carbon nanotubes in an amount ranging from about 0.1 to about 3 wt % of the total composite, while structural properties, such as tensile strength, may be improved by including carbon nanotubes in an amount ranging from about 3 to about 15 wt % of the total composite, and permeation in a composite may be reduced by including clay nanoparticles in an amount ranging from about 3 to about 15 wt % of the total composite. Another factor which may be considered in determining the amount of nanoparticles in the composite is whether the composite includes a fibrous structural reinforcement. For example, in some embodiments which do not include a fibrous structural reinforcement, the amount of nanoparticles may be greater than the amount in composites which do include a fibrous structural reinforcement.

In some embodiments, the nanoparticle-containing composite may include a fibrous structural reinforcement. A fibrous structural reinforcement may comprise fibers of varying lengths, including: continuous fibers, e.g., fibers having a length of greater than about 4 inches; long-discontinuous fibers, e.g., fibers having a length of from about 0.5 to about 4 inches; and discontinuous fibers, e.g., fibers having a length of less than about 0.5 inches. Continuous fiber structural reinforcements may have a variety of configurations including, for example, tapes or tows comprising uniformly disposed, parallel filaments and/or cloth woven from continuous fiber tow. Long-discontinuous fiber reinforcements may also have a variety of configurations including, for example, uniformly disposed, parallel filaments or cloth woven from long-discontinuous fiber tow. Similarly, a variety of discontinuous fiber structural reinforcements may be utilized, including, for example, random mats of discontinuous fibers.

Fibrous structural reinforcements, e.g., those comprising continuous fibers, long-discontinuous fibers, and/or discontinuous fibers, may comprise any of numerous kinds of fibers including synthetic and/or natural fibers. For example, in some embodiments, fibrous structural reinforcements may comprise one or more of: glass fibers and/or fibers formed of silicon carbide; alumina; titania; boron and the like; carbon and/or graphite fibers; as well as fibers formed from organic polymers, such as aromatic polyamides, polyethylenes, polyolefins, polyarylates, and polyaryl ethers. In an exemplary embodiment, the continuous fibrous structural reinforcement may comprise glass fibers, carbon fibers and/or aramid fibers such as the fibers sold by the DuPont Company under the tradename KEVLAR® or fibers sold by Tiejin under the tradename TWARON®.

The fibrous structural reinforcement, when present, may comprise varying proportions of the final composite. The proportion may be dependent on the end use envisioned, as well as the particular resin, fiber and processing method utilized. In some embodiments, the fibrous structural reinforcement may comprise from about 20 vol % or less to about 80 vol % or more of the total composite. For example, the fibrous structural reinforcement, when present, may comprise about 20, 25, 30, 35, 40, 45, 50, 55, 60, 65, 70, 75 or 80 vol % of the final composite, including any and all values and ranges therebetween.

Nanoparticle-containing composites may be produced, in some embodiments, by combining a plurality of nanoparticles with a thermoplastic polymer matrix resin. The plurality of nanoparticles may be combined with the thermoplastic polymer in a variety of ways, and preferably the method of combining achieves a substantially uniform dispersion of nanoparticles in the polymer. For example, the method of combining preferably results in the nanoparticles forming a substantially homogenous dispersion throughout the thickness of the polymer. In many embodiments, the nanoparticles may be combined with a thermoplastic polymer in a liquid state, such as a molten liquid state. Alternatively, the nanoparticles may be combined with a thermoplastic polymer matrix resin solution. In other embodiments, the nanoparticles may be combined with a thermoplastic polymer in a solid state, for example, the particles may be combined with a thermoplastic polymer in a powder form. In some embodiments, the nanoparticles may be sprayed or dispersed on the surface of the thermoplastic polymer. However, these embodiments do not typically achieve a substantially uniform dispersion of nanoparticles through the thickness of the polymer, but may be used in applications wherein a surface coating of particles achieves a desired property enhancement.

In some embodiments, the method of producing a nanoparticle-containing composite may also include contacting, e.g., impregnating, a fibrous structural reinforcement with the thermoplastic polymer matrix resin and the plurality of nanoparticles. In many embodiments, the thermoplastic polymer matrix resin and plurality of nanoparticles may be combined prior to contacting the fibrous structural reinforcement. However, in some embodiments, the fibrous structural reinforcement may be contacted with the thermoplastic polymer matrix resin and nanoparticles separately, e.g., prior to their being combined. For example, the fibrous structural reinforcement may be first contacted with the polymer matrix resin and subsequently contacted with the nanoparticles or alternatively, the fibrous structural reinforcement may be contacted with the nanoparticles and subsequently contacted with the polymer matrix resin.

The fibrous structural reinforcement may be impregnated with the thermoplastic polymer matrix resin or the combination of thermoplastic polymer matrix resin and nanoparticles using any of numerous methods ordinarily used for impregnating fiber reinforcements. For example, exemplary methods may include melt coating, calendaring, dip impregnation with a resin solution or molten resin, melt pressing the tape or fabric in a film of the nanoparticle-containing thermoplastic polymer or the like. A variety of factors may affect the choice of which method to utilize including, for example, the solubility of the thermoplastic polymer in a particular solvent and/or the viscosity of the polymer, and the particular selection is well within the ordinary skill of those in the field.

The nanoparticle-containing composites, according to the present disclosure, may be used to form multi-ply composite laminates. For example, a multi-ply composite laminate may comprise a plurality of nanoparticle-containing composites layered over one another. For example, a multi-ply composite laminate may include as few as two layers or as many as several hundreds of layers, e.g., about 200, 300, 400 or even more layers, depending on the desired end use. Individual layers may be from about 1 mil to about 20 mils thick. For example, layers formed using unidirectional tapes may be about 5 mils thick, while layers formed from woven fabrics may have a thickness greater than about 5 mils.

In many embodiments, the multi-ply composite laminate may comprise a plurality of layers of nanoparticle-containing composites that have been joined or fused to one another. For example, the layers may be fused to one another by the application of heat and/or pressure using any of the variety of methods and conventional processing devices and equipment ordinarily used for the production of layered composites. Advantageously, in many embodiments, the composite laminates may be formed using an automated process. However, in other embodiments, non-automated processes may be utilized. Some exemplary processing methods may include, but are not limited to: automated heated head tape placement; automated heated head tow placement; automated heated head fiber placement; automated heated head tape laying; automated fast tacking with automated heated head tape, tow, or fiber placement; automated fast tacking with autoclave post curing; automated fast tacking with automated tape laying or autoclave post curing; filament winding; roll forming; stretch forming; superforming; matched die forming; hydroforming; wet laying; panel thermoforming; in-line thermoforming; diaphragm forming; extrusion; pultrusion; sheet extrusion; injection molding; compression molding; resin transfer molding (RTM); rotation molding; blow molding; film casting; tow impregnation and consolidation; tape impregnation and consolidation; calendaring; foam processing; thermoplastic adhesive bonding; thermoplastic induction welding; thermoplastic resistance welding; thermoplastic focused infrared welding; thermoplastic ultrasonic welding; thermoplastic hot plate welding; thermoplastic vibration welding; thermoplastic laser welding; and/or thermoplastic microwave welding.

As an example, the plurality of layers may be fused to one another in a heated head process that may fuse the composites at their adjoining surfaces such that the surfaces of the adjacent layers being joined reach their respective melting temperatures without the layers reaching their melting temperatures through their entire thicknesses. Heat and pressure may be applied to an incoming layer, such as layer formed as a tape or tow, and the previously consolidated layers. The temperature gradient through the thickness of the incoming layer may be controlled such that the surface of the incoming layer that will contact the surface of the previously consolidated layers reaches its melting temperature (i.e., melts), while the surface of the incoming layer opposite that which will contact the surface of the previously consolidated layers does not exceed the melt temperature (i.e., does not melt). In this manner the interface between the incoming layer and the previously consolidated layers may reach the melting temperature without overheating the opposite surface of the incoming layer. A heated head process may be performed using a heated head. The heated head may include a feeder to deploy the incoming layer, a nip roller providing accurate feeding, clamping devices, and cutting devices. Additionally, a heated head may include torches directing heated air to the incoming layer and/or previously consolidated layers. A first torch of the heated head may heat the previously consolidated layers and a second torch may trim heat the incoming layer. A first heated roller of the heated head may establish the initial intimate contact between the interfacing surfaces of the incoming layer and previously consolidated layers and may initiate healing in those locations where intimate contact has been achieved. Consolidation may also begin under the heated rollers. A heated shoe of the heated head may maintain the temperature long enough to promote further intimate contact and complete healing of the longest polymer chains to develop interlayer strength, and a second roller of the heated head may consolidate and chill the incoming layer now fused to the previously consolidated layers, refreezing them in place and compressing the voids. Additionally, a chilled shoe may extend the process. Using the various rollers, torches, and shoes, the heated head may fuse layers in a heated head process that is continuous and dynamic by directionally moving the melt region along the previously consolidated layers to sequentially fuse the incoming layers to the previously consolidated layers. For example, the heated head may be suspended from a gantry and may move along the previously consolidated layers to move the melt region and fuse the layers. As another example, the heated head may remain stationary and the previously consolidated layers may move or rotate relative to the heated head to move the melt region and fuse the layers. As a further example, the heated head and the previously consolidated layers may both move to move the melt region and fuse the layers. In this manner, by the directional motion of the heated head and/or previously consolidated layers, layers may be sequentially fused to one another via a moving heated head process. While the preceding example has been discussed in terms of a heated head process including one or more roller applying heat and pressure, such a heated head process is presented merely as an example. One of ordinary skill in the art would understand that other processing methods may be used to fuse the plurality of layers to one another, such as other methods that may fuse the composites at their adjoining surfaces such that the surfaces of the adjacent layers being joined reach their respective melting temperatures without the layers reaching their melting temperatures through their entire thicknesses.

An example moving heated head system 100 is illustrated in FIG. 1. As an example, the moving heated head system 100 may be suspended from a gantry and may move along the previously consolidated layers 101 to move the melt region and fuse the new layer 107 to the previously consolidated layers 101. The moving heated head system 100 may include a series of torches 103 to heat the layer, one or more rollers 104, and one or more heated heads 105 supported in a frame 102 that moves laterally along the previously consolidated layers 101 to contact a fibrous structural reinforcement with a thermoplastic polymer matrix resin and a plurality of nanoparticles to form a plurality of nanoparticle-containing composites, layer the plurality of nanoparticle-containing composites, and fuse the layers sequentially to one another. A moving heated head process is a layer by layer additive process whereby a layer of composite tape is joined to another layer of composite tape using heat applied at the nip point (the joining location) of the two tapes. The heat creates a melt region of polymer that translates with the lateral movement of the heated head and the deposition of additional tape. Upon cooling, a fully consolidated composite is produced.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including", and "containing" are to be construed as open-ended terms (i.e., meaning "including, but not limited to,") unless otherwise noted. The use of any and all exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Thermoplastic laminates in situ consolidates via tape or tow placement require fill mechanical properties. Realizing full properties requires resin crystallinity to be controlled—partial crystallinity leads to unacceptably low laminate compression properties. There are two approaches: utilize an amorphous matrix resin; or place material made from a semi-crystalline resin featuring kinetics faster than the process. In this paper, a matrix resin evaluation and trade study was completed with commercial and NASA Langley Research Center (LaRC) amorphous polyimides on the one hand, and with PEKK mixed with POSS nanoparticles for accelerated crystallinity growth on the other. A new thermoplastic impregnated material, 6 mm wide (0.25-in) AS-4 carbon/LaRC 8515 is fully amorphous, it attains full properties following in situ consolidation, with no post processing required to build crystallinity. The tow in situ processing was demonstrated via in situ thermoplastic filament winding it into rings.

The thermoplastic automated tape placement head is mounted to a high-rail gantry motion mechanism. The coordinated gantry/head motion together with the on-head polymer process enables the fabrication of open-section flat laminates without requiring an autoclave. The deposition head preheats the thermoplastic tape and pre-laid laminate to the melting temperature, and then welds them together under head and pressure until the composite material is healed and consolidated. Open Hole Compression (OHC) strength targets remain 85% of properties obtained by testing autoclaved laminates. Attention thus focused on matrix resin crystallinity. Three examples were documented were the fill polymer matrix crystallinity appears not to have been achieved because the rein (polyetherketone or polyimide) crystalline kinetics were slower than the in situ process. Without full crystallinity, the full resin modulus is never attained, and compression properties of the composite laminate suffer.

Process options to accommodate the slow resin crystallinity were (1) to place more slowly, (2) increase the overall deposition head length, or (3) anneal the final part. The best material option is by controlling matrix resin crystallinity.

A "placement grade" thermoplastic tow and tape specification is defined. It specifies, among other attributes, a 75 mm (+0.00 mm, −0.10 mm) wide tape or 6.35 mm 0.127 min tow, a thickness variation within 6% including ends, 35±1% resin weight fraction, a void content below 1%, and a goal fiber areal weight of 145 g/m$^2$.

Further, the resin must be either fully amorphous or semi-crystalline. If an amorphous material is used, it cannot crystallize out of the melt. If semi-crystalline, the resin must achieve full crystallinity within the placement time of the in situ process. The incoming laminate at 45° C. is heated to 380° C., then chilled to neat $T_g$ over a 15 second time span. if the matrix resin is fully amorphous, this process timing is inconsequential; the process conditions can be optimized to generate quality time to achieve full crystallinity must be considered. The optimal crystallinity growth rate is approximately ⅔rds the way from $T_g$ to $T_{melt}$. Thus, to guarantee full crystallinity in the completed laminate, the crystalline kinetics must be quicker than 15 seconds. This requirement can be relaxed somewhat due to the heating effect from subsequent passes, but must be increased by the desire to place faster.

For semi-crystalline resins, the addition of POSS (Polyhedral oligomeric silsesquioxane) nanoparticles to increase the rate and amount of resin crystallinity was evaluated. PEEK is fast enough, but the two nanoparticles, $Ph_8T_8$ ("FOSS 8") and $Ph_{12}T_{12}$ ("FOSS 12") proved ineffective in speeding PEKK crystallinity at the nanoparticle ratios evaluated, likely due to inadequate particle blending.

Four sets of amorphous polymers were considered before NASA LaRC's amorphous polyimides were selected for development, The NASA resins included:

NASA-LaRC—SI (Soluble Imide) polyimide matrix resin

NASA-LaRC—IA—a polyimide matrix resin based on oxydiphthalic anhydride and 3,4% oxydianiline, and encapped with phthalic anhydride, with a melt processability at a low temperature (325-350° C.)

NASA-LaRC—IAX—a polyimide matrix resin based on ODPA dianhydrides with chains encapped with phthalic anhydride, a modification of LaRC—IA backbone by incorporating a mixture of 90 mole percent 3,4'-oxydianiline (3,4'-ODA) and 10 mole percent of a rigid diamine, p-phylene diamine p-PDA (10%)

NASA-LaRC 8515—aromatic polymide is based on 3,3', 4,4'-biphenyltetracarboxylic dianhydride (BPDA) and an 85:15 ratio of 3,4'-oxydianiline (3,4'-ODA) and 1-,3-bis (3aminopheonxy)benzene (APB). The polyimide chains are endcapped with phthalic anhydride.

The NASA LaRC polyimides can be formulated at 2% to 5.5% offsets (from stoichiometry) to produce polymers with MW and flow characteristics. Table 1 shows the effect of different offset chemistries resulting in different flow characteristics:

| Stochiometric Offset | Molecular Weight |
|---|---|
| 2% | 22000 |
| 4% | 11400 |
| 5% | 6900 |
| 5.5% | 9100 |

Synthesizing LaRC: 8515 with a 5.5% offset yielded a 9,100 MW polyimide but previous experience indicated the properties would suffer. At 2% and 4% offset, thermoplastic impregnation into a tow might suffer. A 5% offset yielding 6900 MW was likely acceptable for fabrication of a thermoplastic, tow. Sample amounts of several of these polymers were obtained and DSC scans were run.

Of the five synthesized polymides considered, NASA-LaRC 8515 features both the highest offset giving the lowest viscosity and the highest $T_g$. LaRC 8515 is thus clearly preferred over the other polyimides evaluated. In the actual DSC scans, there were no indications of crystallinity. Heating the polymer to 380° C. (715° C.) eliminated the chance that the 8515 polymer would recrystallize from the melt.

The mechanical strength for IM-7 carbon/NASA LaRC 8515 laminates made by Fiberite (now Cytec Engineered Materials) and by NASA were compared with the strength properties for IM-7 carbon/PETI-5 laminates made by NASA. Compared with PETI-5 composites, LaRC 8515 laminates have comparable OHN strengths, higher 0° flexure strengths, similar 90° flexure strengths, and higher interlaminar shear strengths, especially at room temperature conditions. Finally, LaRC 8515 laminates exhibit good solvent resistance. The final polymer chosen for tow and part fabrication was NASA-LaRC 8515, for its superior $T_g$, mechanical properties, good flow characteristics at melt, and no crystallinity after processing.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, the invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed as new and desired to be secured by Letters Patent of the United States is:

1. A method of producing a nanoparticle-containing composite laminate comprising:
   contacting a fibrous structural reinforcement with a thermoplastic polymer matrix resin and a plurality of nanoparticles to form a plurality of nanoparticle-containing composites, wherein the nanoparticles comprise at least one of nanofibers and nanotubes;
   layering the plurality of nanoparticle-containing composites; and
   fusing the layers sequentially to one another via a moving heated head process to form a completed laminate in which the thermoplastic polymer matrix resin has full crystallinity.

2. The method of producing a nanoparticle-containing composite laminate according to claim 1 wherein the thermoplastic polymer matrix resin and plurality of nanoparticles are combined and the fibrous structural reinforcement is contacted with the combination of thermoplastic polymer resin and plurality of nanoparticles.

3. The method of producing a nanoparticle-containing composite laminate according to claim 1 wherein the moving heated head process comprises an automated process.

4. The method of producing a nanoparticle-containing composite laminate according to claim 3 wherein the automated process is selected from automated heated head tape placement, automated heated head tow placement, automated heated head fiber placement, and automated heated head tape laying.

5. The method of producing a nanoparticle-containing composite laminate according to claim 1 wherein said laminate includes at least one non-fibrous structural reinforced layer formed by combining a thermoplastic polymer matrix resin with a plurality of nanoparticles to form a nanoparticle-containing composite.

6. The method of producing a nanoparticle-containing composite laminate according to claim 1, wherein the step of contacting a fibrous structural reinforcement with a thermoplastic polymer matrix resin and a plurality of nanoparticles comprises at least one of: melt coating, calendaring, dip impregnation with a resin solution or molten resin, and melt pressing the fibrous structural reinforcement in a film of the nanoparticle-containing thermoplastic polymer.

7. The method of producing a nanoparticle-containing composite laminate according to claim 1 wherein the fibrous structural reinforcements comprise at least one of: glass fibers, silicon carbide fibers, alumina, titania, boron, carbon, graphite fibers, and fibers formed from organic polymers such as aromatic polyamides, polyethylenes, polyolefins, polyarylates, and polyaryl ethers.

8. The method of producing a nanoparticle-containing composite laminate according to claim 1, wherein the nanoparticles have a particle size greater than 500 nm to less than 999 nm.

9. The method of producing a nanoparticle-containing composite laminate according to claim 1, wherein the nanoparticles have a particle size greater than 200 nm and less than 999 nm.

10. The method of producing a nanoparticle-containing composite laminate according to claim 1 wherein the fibrous structural reinforcements comprise from about 20 vol % to about 80 vol % of the total composite.

11. The method of producing a nanoparticle-containing composite laminate according to claim 1 wherein the moving heated head process comprises a processes in which a heated head moves laterally relative to a previously fused layer that remains stationary or the heated head and the previously fused layer move laterally relative to one another.

12. A method of producing a nanoparticle-containing composite laminate comprising:
contacting a fibrous structural reinforcement with a thermoplastic polymer matrix resin and a plurality of nanoparticles to form a plurality of nanoparticle-containing composites, wherein the nanoparticles comprise at least one of nanofibers and nanotubes;
layering the plurality of nanoparticle-containing composites with respect to each other to form adjacent layers; and
fusing the composites sequentially only at adjoining surfaces between the adjacent layers by moving a melt region of the composites without melting each layer through its respective thickness.

13. The method of producing a nanoparticle-containing composite laminate according to claim 12 wherein the melt region is moved by moving a heated head laterally relative to a previously fused layer that remains stationary, or moving both the heated head and the previously fused layer laterally relative to one another.

14. A method of producing a nanoparticle-containing composite laminate comprising:
mixing at least one of nanotubes and nariofibers with a thermoplastic polymer resin;
contacting a fibrous structural reinforcement with the thermoplastic polymer to form an elongated composite strip in which the thermoplastic polymer resin is fully amorphous or semi-crystalline;
layering the elongated composite strips; and
fusing the layers sequentially to one another via a moving heated head process to produce full crystallinity in the thermoplastic polymer of a completed laminate.

* * * * *